(12) United States Patent
Yamada et al.

(10) Patent No.: US 9,286,018 B2
(45) Date of Patent: Mar. 15, 2016

(54) IMAGE PROCESSING DEVICE FOR IMPROVED ACCESS EFFICIENCY

(75) Inventors: Yasuhiro Yamada, Kanagawa (JP);
Norihiko Nagai, Kanagawa (JP)

(73) Assignee: NTT Electronics Corporation (JP)

( * ) Notice: Subject to any disclaimer, the term of this patent is extended or adjusted under 35 U.S.C. 154(b) by 41 days.

(21) Appl. No.: 13/704,303

(22) PCT Filed: Jun. 7, 2011

(86) PCT No.: PCT/JP2011/063067
§ 371 (c)(1),
(2), (4) Date: Dec. 14, 2012

(87) PCT Pub. No.: WO2011/158699
PCT Pub. Date: Dec. 22, 2011

(65) Prior Publication Data
US 2013/0088756 A1    Apr. 11, 2013

(30) Foreign Application Priority Data

Jun. 17, 2010    (JP) ................. 2010-138566

(51) Int. Cl.
*G06F 3/12* (2006.01)
*G06T 3/40* (2006.01)
*G06T 1/60* (2006.01)

(52) U.S. Cl.
CPC ............. *G06F 3/1296* (2013.01); *G06T 1/60* (2013.01); *G06T 3/4038* (2013.01)

(58) Field of Classification Search
None
See application file for complete search history.

(56) References Cited

U.S. PATENT DOCUMENTS

| 4,524,456 | A  | * | 6/1985  | Araki et al. ................... 382/242 |
| 6,181,833 | B1 | * | 1/2001  | Kuwabara ............. H04N 1/393 |
|           |    |   |         | 358/451 |
| 6,801,209 | B1 | * | 10/2004 | Chen et al. ..................... 345/572 |
| 7,483,033 | B2 | * | 1/2009  | Enomoto ....................... 345/574 |
| 2004/0169877 | A1 | * | 9/2004 | Sadowara ..................... 358/1.13 |
| 2007/0279426 | A1 | * | 12/2007 | Tanaka et al. ................. 345/544 |
| 2009/0070570 | A1 | * | 3/2009 | Choudhury et al. .......... 712/244 |

FOREIGN PATENT DOCUMENTS

| CN | 101060628 A  | 10/2007 |
| JP | 10-269706    | 10/1998 |
| JP | 2001-144716  | 5/2001  |
| JP | 2007-312358 A | 11/2007 |
| JP | 2009-116763 A | 5/2009  |

OTHER PUBLICATIONS

Office Action, Japanese Patent Application No. 2012-520382, mailed Jan. 28, 2014.
International Search Report, PCT Application No. PCT/JP2011/063067, mailed Jul. 19, 2011.

(Continued)

*Primary Examiner* — Ming Hon
(74) *Attorney, Agent, or Firm* — Kilpatrick Townsend & Stockton LLP

(57) ABSTRACT

An image processing device carries out processing in a processing unit of 3-blocks. Data of 192(=64×3)-pixels is required in the processing of 3-blocks. This is an amount of data corresponding to 16-cells. When 3-blocks and 16-cells are arranged along an scanning direction of an image, both ends of them in the scanning direction are aligned.

3 Claims, 13 Drawing Sheets

(56) References Cited

OTHER PUBLICATIONS

Office Action, Canadian Patent Application No. 2,802,666, mailed Jun. 17, 2014.

Office Action, Chinese Patent Application No. 201180029707ZX, mailed Nov. 4, 2014.

* cited by examiner

FIG. 2
(a)
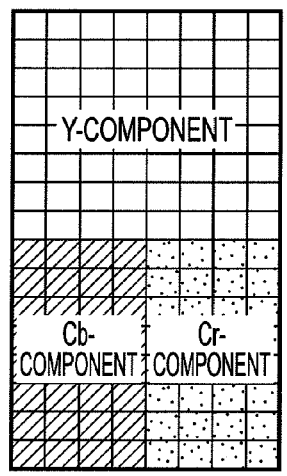
(b)
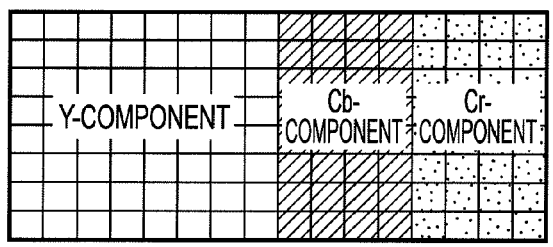
(c)
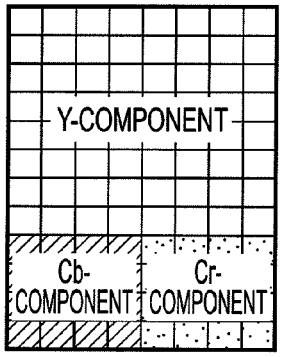
(d)
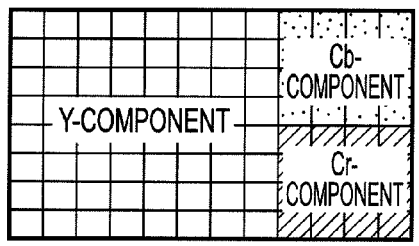

FIG. 12

| Bank-A RA=0 CA= 0~7 | Bank-B RA=0 CA= 0~7 | Bank-C RA=0 CA= 0~7 | Bank-D RA=0 CA= 0~7 | Bank-A RA=0 CA= 8~15 | Bank-B RA=0 CA= 8~15 | Bank-C RA=0 CA= 8~15 | Bank-D RA=0 CA= 8~15 | Bank-A RA=0 CA= 16~23 |
|---|---|---|---|---|---|---|---|---|
| Bank-E RA=0 CA= 0~7 | Bank-F RA=0 CA= 0~7 | Bank-G RA=0 CA= 0~7 | Bank-H RA=0 CA= 0~7 | Bank-E RA=0 CA= 8~15 | Bank-F RA=0 CA= 8~15 | Bank-G RA=0 CA= 8~15 | Bank-H RA=0 CA= 8~15 | Bank-E RA=0 CA= 16~23 |
| Bank-A RA=2 CA= 0~7 | Bank-B RA=2 CA= 0~7 | Bank-C RA=2 CA= 0~7 | Bank-D RA=2 CA= 0~7 | Bank-A RA=2 CA= 8~15 | Bank-B RA=2 CA= 8~15 | Bank-C RA=2 CA= 8~15 | Bank-D RA=2 CA= 8~15 | Bank-A RA=2 CA= 16~23 |
| Bank-E RA=2 CA= 0~7 | Bank-F RA=2 CA= 0~7 | Bank-G RA=2 CA= 0~7 | Bank-H RA=2 CA= 0~7 | Bank-E RA=2 CA= 8~15 | Bank-F RA=2 CA= 8~15 | Bank-G RA=2 CA= 8~15 | Bank-H RA=2 CA= 8~15 | Bank-E RA=2 CA= 16~23 |

ARRANGEMENT EXAMPLE OF CELL IN EACH Bank ENABLING ROW ADDRESS CHANGE

TIMING CHART OF CONTINUOUS ACCESS IN RECTANGULAR REGION

US 9,286,018 B2

IMAGE PROCESSING DEVICE FOR IMPROVED ACCESS EFFICIENCY

This application is a national stage application of PCT/JP2011/063067 which claims priority to JP 2010-138566, both of which are incorporated herein by reference.

TECHNICAL FIELD

The present invention relates to an image processing device that improves access efficiency of SDRAM in processing of data of pixels each having the number of bits which is non-power-of-two, while using the pixels in image processing efficiently.

BACKGROUND ART

As a conventional technology for converting 16-bits and 10-bits, there has been known Patent Literature 1. When the conventional technology is applied to a burst access of SDRAM, a cell of 12-pixels (e.g., 3×4) is obtained from one burst access. In order to dispose cells such that they fill an image block of 8×8 pixels which is a unit in image processing and is frequently used in image compression, 6-cells are required. In this case, data of 8-pixels is not used in the image processing of the block of 8×8 pixels to be wasted. This decreases access efficiency. In the case of this example, since it accesses 72-pixels for 64-pixels, access efficiency is about 89%. Further, if one pixel has 10-bits, since it accesses 128-bits for access of 12 pixels (=120-bits), access efficiency is about 94%. Nearly, access efficiency becomes about 88%.

The access efficiency of 89% is inadequate, and it is desirable that the access efficiency becomes closer to 100% by improving it to the extent possible.

CITATION LIST

Patent Literature

[PTL 1]
Japanese Patent Application Laid-Open Publication No. 2001-144716

SUMMARY OF INVENTION

Technical Problem

The present invention is made in view of the above problem, and it is an object thereof to provide an image processing device that improves access efficiency of SDRAM in processing of data of pixels each having the number of bits which is non-power-of-two, while using the pixels in image processing efficiently.

Solution to Problem

In order to solve the above problem, an image processing device according to the present invention includes: an image processor that processes data related to an image; and a memory that stores therein data before or after processing, wherein a region corresponding to a processing unit in the image by the image processor is defined as a block, a region smaller than the block corresponding to a transfer unit of data of the memory in the image is defined as a cell, and when one or more blocks and two or more cells are arranged along a scanning direction of the image, both ends of them in the scanning direction are aligned.

Advantageous Effects of Invention

According to the present invention, it is possible to improve access efficiency of SDRAM in processing of data of pixels each having the number of bits which is non-power-of-two, while using the pixels in image processing with economy.

BRIEF DESCRIPTION OF DRAWINGS

FIG. 2 It is a diagram that illustrates another example related to a shape and a size of a block according to the exemplary embodiment of the present invention.

FIG. 12 It is a diagram that illustrates a formation example of image data in one frame when one word of SDRAM has 16-bits, image data has 10-bits/pixel, and the amount of burst access is 128-bits according to the exemplary embodiment of the present invention.

DESCRIPTION OF EMBODIMENTS

An exemplary embodiment of the present invention will be described below with reference to drawings.

Figure 1:
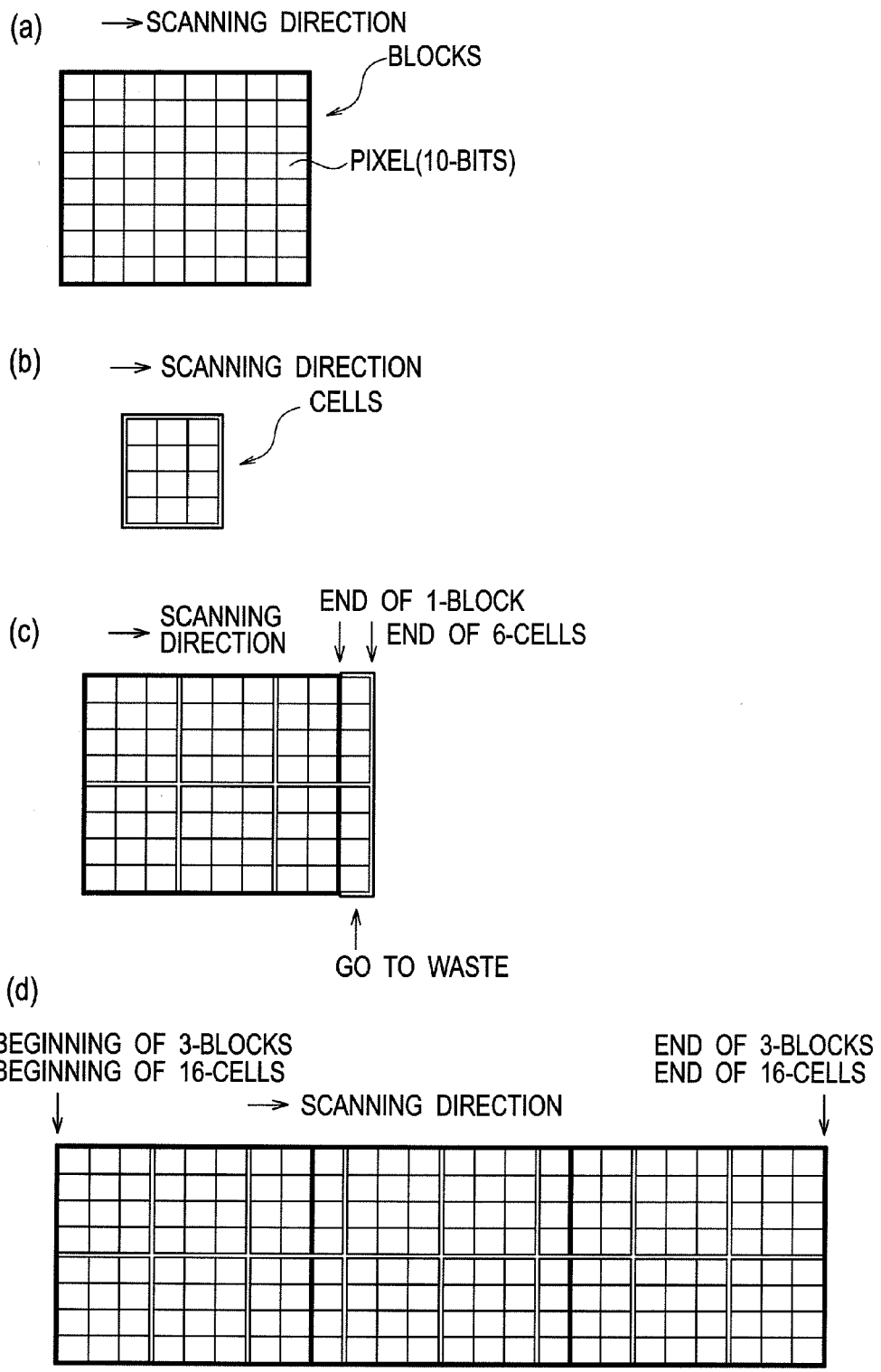
FIG. 1 It is a diagram that illustrates a positional relation between a block and a cell included in an image of an image processing device according to an exemplary embodiment of the present invention.

FIG. 1 is a diagram that illustrates a positional relation between a block and a cell included in an image of an image processing device according to the present embodiment. The image processing device according to the present embodiment carries out processing in a unit of area (a block shown in FIG. 1(a)) surrounded by 8-pixels in a scanning direction (that is horizontal direction) and 8-pixels in a vertical direction in an image which is composed of plural pixels arranged in a matrix state. Data of 1-pixel has 10-bits.

On the other hand, the image processing device includes SDRAM (Synchronous Dynamic Random Access Memory). A word which is a unit in reading/writing (collectively called transfer) of SDRAM has 16-bits. In SDRAM, an 8-words continuous transfer (burst access (burst transfer)) is carried out. In one burst access, 128(=16×8)-bits are transferred. In 128-bits, data of 12-pixels (12×10=120-bits) is included. The 12-pixels is called a cell for convenience.

As shown in FIG. 1(b), the cell corresponds to an area (12-pixels) surrounded by 3-pixels in the scanning direction and 4-pixels in the vertical direction, for example. In processing of 1-block, data of 64-pixels is required. As shown in FIG. 1(c), if the cell has 12-pixels, at least six burst transfers (12-pixels×6-cells=data transfer of 72-pixels) are required.

Thus, as shown in FIG. 1(c), data of 8-pixels is not used to go to waste in image processing of a block of 8×8 pixels. This is because when 1-block and 6-cells are arranged in the scanning direction, both ends of them can not be aligned in the scanning direction.

In view of the above, the image processing device carries out processing in a processing unit of 3-blocks. In the processing of 3-blocks, data of 192(=64×3)-pixels is required. This is a data amount corresponding to 16-cells. As shown in FIG. 1(d), when 3-blocks and 16-cells are arranged in the scanning direction of an image, both ends of them in the scanning direction are aligned.

Therefore, there is no data not used in image processing as shown in FIG. 1(c). That is, access efficiency of SDRAM is 100%.

If the number of blocks for the processing unit is increased, the volume of SRAM used in the image processing device needs to be increased. So, it is preferable that the number of blocks for the processing unit is 10 or less. It is noted that the block is not limited to the area surrounded by 8-pixels in the scanning direction and 8-pixels in the vertical direction.

For example, the block may be an area surrounded by 8-pixels in the scanning direction and 16-pixels in the vertical direction as shown in FIG. 2(a), or an area surrounded by 16-pixels in the scanning direction and 8-pixels in the vertical direction as shown in FIG. 2(b). This block is composed of a luminance component (Y-component) area surrounded by 8-pixels in the scanning direction and 8-pixels in the vertical direction, a chrominance component (Cb-component) area surrounded by 4-pixels in the scanning direction and 8-pixels in the vertical direction, and a chrominance component (Cr-component) area surrounded by 4-pixels in the scanning direction and 8-pixels in the vertical direction, for example. This arrangement is called "4:2:2 chroma format".

Alternately, the block may be an area surrounded by 8-pixels in the scanning direction and 12-pixels in the vertical direction as shown in FIG. 2(c), or an area surrounded by 12-pixels in the scanning direction and 8-pixels in the vertical direction as shown in FIG. 2(d). This block is composed of a luminance component (Y-component) area surrounded by 8-pixels in the scanning direction and 8-pixels in the vertical direction, a chrominance component (Cb-component) area surrounded by 4-pixels in the scanning direction and 4-pixels in the vertical direction, and a chrominance component (Cr-component) area surrounded by 4-pixels in the scanning direction and 4-pixels in the vertical direction, for example. This arrangement is called "4:2:0 chroma format". The cell is also not be limited to 12-pixels.

For example, data of 1-pixel may have 12-bits and the cell has 10-pixels. If two SDRAMs are used to transfer 16-words (256-bits) twice larger than one SDRAM in one burst access, the number of pixels in the cell can be doubled.

Thus, even if the size and/or shape of block and/or cell are changed, access efficiency of SDRAM is increased by carrying out the arrangement based on the above-described rule.

Figure 3:
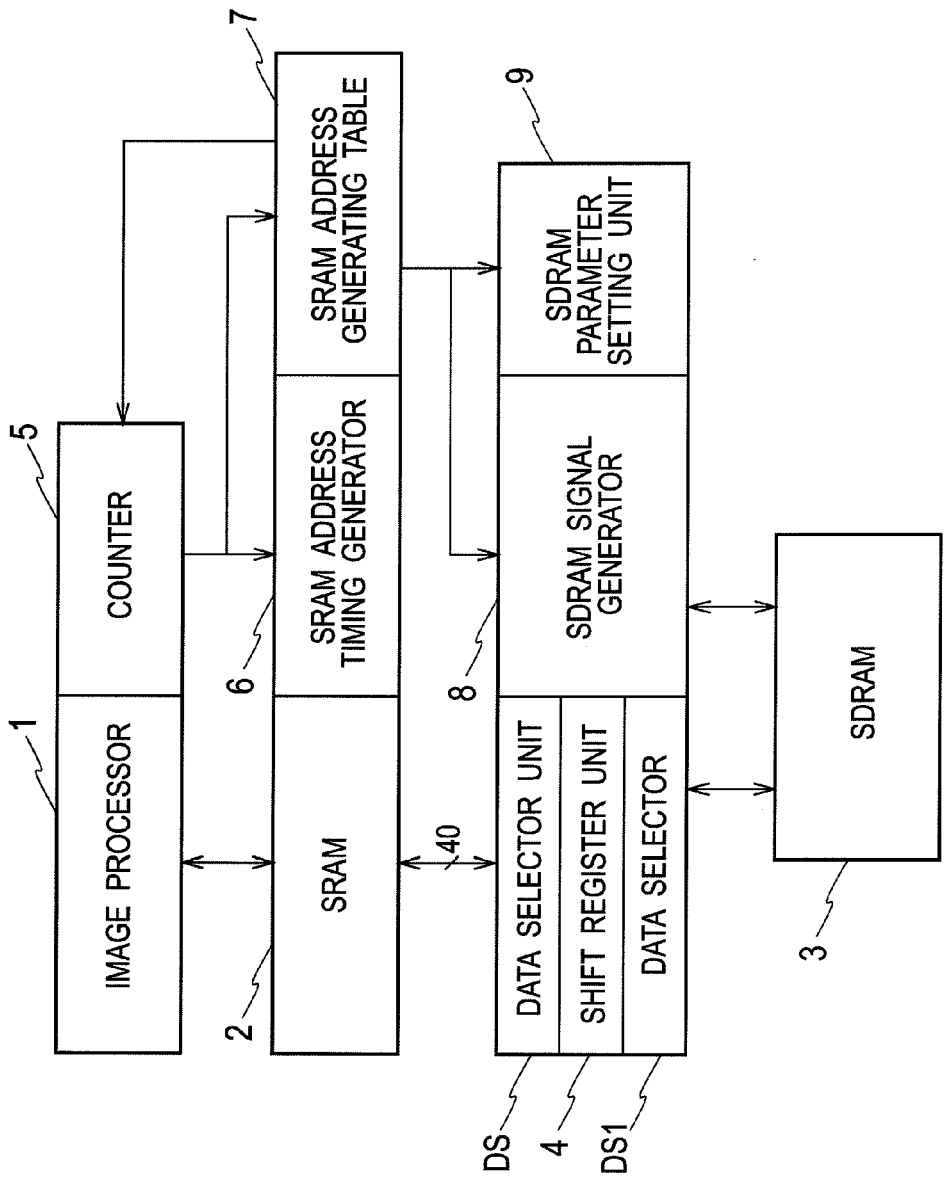
FIG. 3 It is a block diagram that illustrates a configuration of the image processing device according to the exemplary embodiment of the present invention.

FIG. 3 is a block diagram that illustrates a configuration of the image processing device. The image processing device includes an image processor 1, SRAM 2, SDRAM 3, a data selector unit DS, a shift register unit 4, a data selector DS1, a counter 5, an SRAM address timing generator 6, an SRAM address generating table 7, an SDRAM signal generator 8 and an SDRAM parameter setting unit 9.

SRAM 2 is a working memory. Since SRAM easily carries out a random access and realizes a medium-scale volume, SRAM is used as a working memory in the image processing device.

A buffer for SDRAM 3 includes SRAM 2 (working memory) and the shift register unit 4 (arrangement of registers).

SDRAM 3 has Banks (e.g., eight banks A to H), each of which has the same size, which are obtained by dividing a memory area into parts whose number is even.

The SRAM address generating table 7 represents each relation between a pixel position in an image and an address in SDRAM 3 (Bank address, Row address and Column address). Namely, the SRAM address generating table 7 represents Bank address, Row address and Column address on SDRAM in which pixel data in each position is stored.

The SDRAM parameter setting unit 9 is an element for setting and controlling an access amount and a cell shape of SDRAM 3. The SDRAM parameter setting unit 9 is provided because a different access control is required in an access for the same 3-blocks due to a difference in block shapes for luminance and chrominance or a difference in block shapes for "4:4:2 format" and "4:2:0 format".

Figure 4:
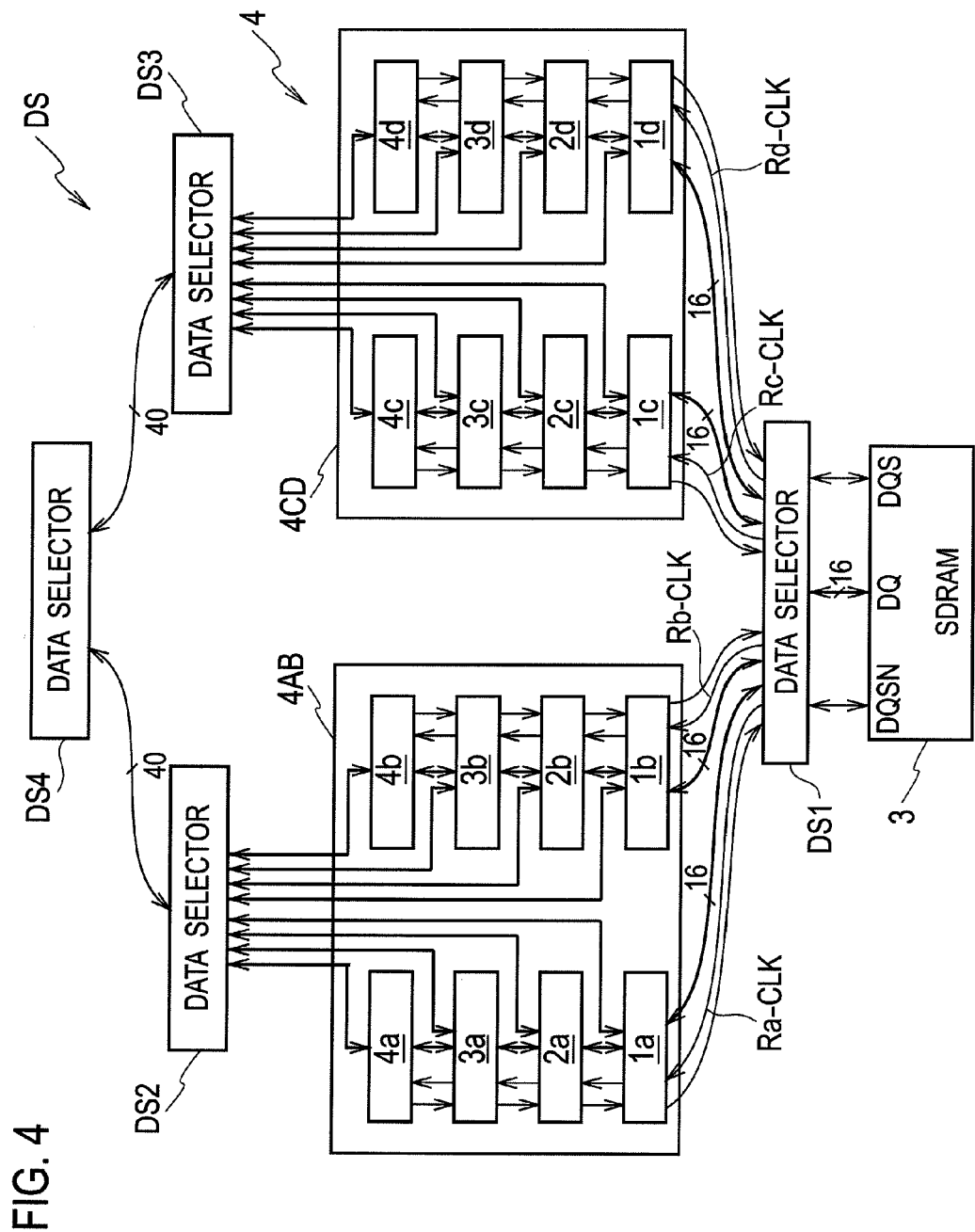
FIG. 4 It is a diagram that illustrates a portion of the image processing device according to the exemplary embodiment of the present invention in detail.

FIG. 4 is a diagram that illustrates a portion of the image processing device in detail. The data selector unit DS includes data selectors DS2, DS3 and DS4. The shift register unit 4 includes shift registers 4AB and 4CD.

The data selector DS2 and the shift register 4AB are used to access to Banks A, C, E and G. The data selector DS3 and the shift register 4CD are used to access to Banks B, D, F and H.

The shift register 4AB has a four stage shift register composed of registers 1a, 2a, 3a and 4a and a four stage shift register composed of registers 1b, 2b, 3b and 4b.

The shift register 4CD has a four stage shift register composed of registers 1c, 2c, 3c and 4c and a four stage shift register composed of registers 1d, 2d, 3d and 4d.

The data selectors DS2 and DS4 are connected to each other via 40-bits bus. The data selectors DS3 and DS4 are also connected to each other via 40-bits bus.

Each of registers 1a, 2a, 3a, 4a, 1b, 2b, 3b and 4b and the data selector DS2 are connected to each other via 16-bits bus (total eight buses). Each of registers 1c, 2c, 3c, 4c, 1d, 2d, 3d and 4d and the data selector DS3 are also connected to each other via 16-bits bus (total eight buses).

The registers 1a to 4a and the data selector DS1 are connected to each other via 16-bits bus, clock signal Ra-CLK and the like. The registers 1b to 4b and the data selector DS1 are connected to each other via 16-bits bus, clock signal Rb-CLK and the like. The registers 1c to 4c and the data selector DS1 are connected to each other via 16-bits bus, clock signal Rc-CLK and the like. The registers 1d to 4d and the data selector DS1 are connected to each other via 16-bits bus, clock signal Rd-CLK and the like. The data selector DS1 and SDRAM 3 are connected to each other via a signal DQS, a signal DQSN (signal generated by delaying signal DQS by half-clock cycle) and a 40-bits data signal DQ.

Figure 5:
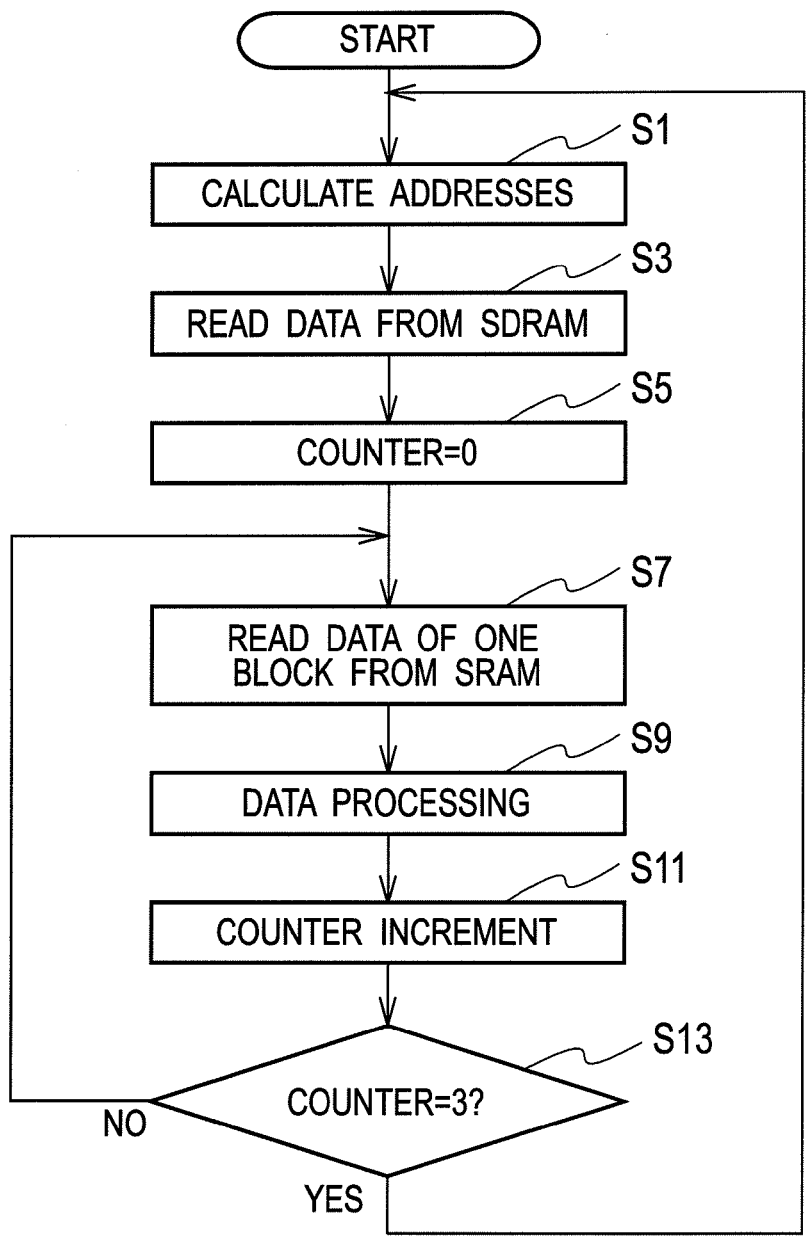
FIG. 5 It is a flowchart when data is read from SDRAM according to the exemplary embodiment of the present invention.

FIG. 5 is a flowchart when data is read from SDRAM. It is here assumed that "the number of blocks necessary for aligning the right end of blocks with the right end of cells" in the explanation described with reference to FIG. 1 is three.

First, the SRAM address timing generator 6 calculates addresses (Bank address, Row address and Column address) of three blocks in SDRAM not subject to processing, with reference to the SRAM address generating table 7 (S1).

Next, data having the calculated addresses are read from SDRAM 3 via the data selector DS1, the shift register unit 4 and the data selector unit DS and written to SRAM 2 (S3).

At this time, the SDRAM signal generator 8 controls SDRAM 3 according to an access timing of SDRAM 3. At this time, the SRAM address timing generator 6 carries out an access control of SRAM 2. At this time, the data selector DS1, the shift register unit 4 and the data selector unit DS carries out arrangement conversion and temporal retention of data of SRAM 2. The SDRAM signal generator 8 controls SDRAM 3 and carries out the arrangement conversion and the control of temporal retention. The SDRAM parameter setting unit 9 sets and controls an access amount and a cell shape of SDRAM 3.

Next, the counter 5 is initialized to have the value "0" (S5). Next, the image processor 1 reads from SRAM 2 data of one block to be processed (S7). At this time, the SRAM address timing generator 6 generates an access control signal for reading.

Next, the image processor 1 processes the data of one block (S9).

Next, the value "1" is added to the counter 5 (S11). Next, it is determined whether or not the counter 5 has the value "3" (S13). If it is determined as NO, the processing returns to step S7. If it is determined as YES, the processing returns to step S1.

It is noted that in order to efficiently access SDRAM, two image processing devices carry out parallel processing of this flowchart such that the timing of one processing differs from the timing of the other processing.

Figure 6:
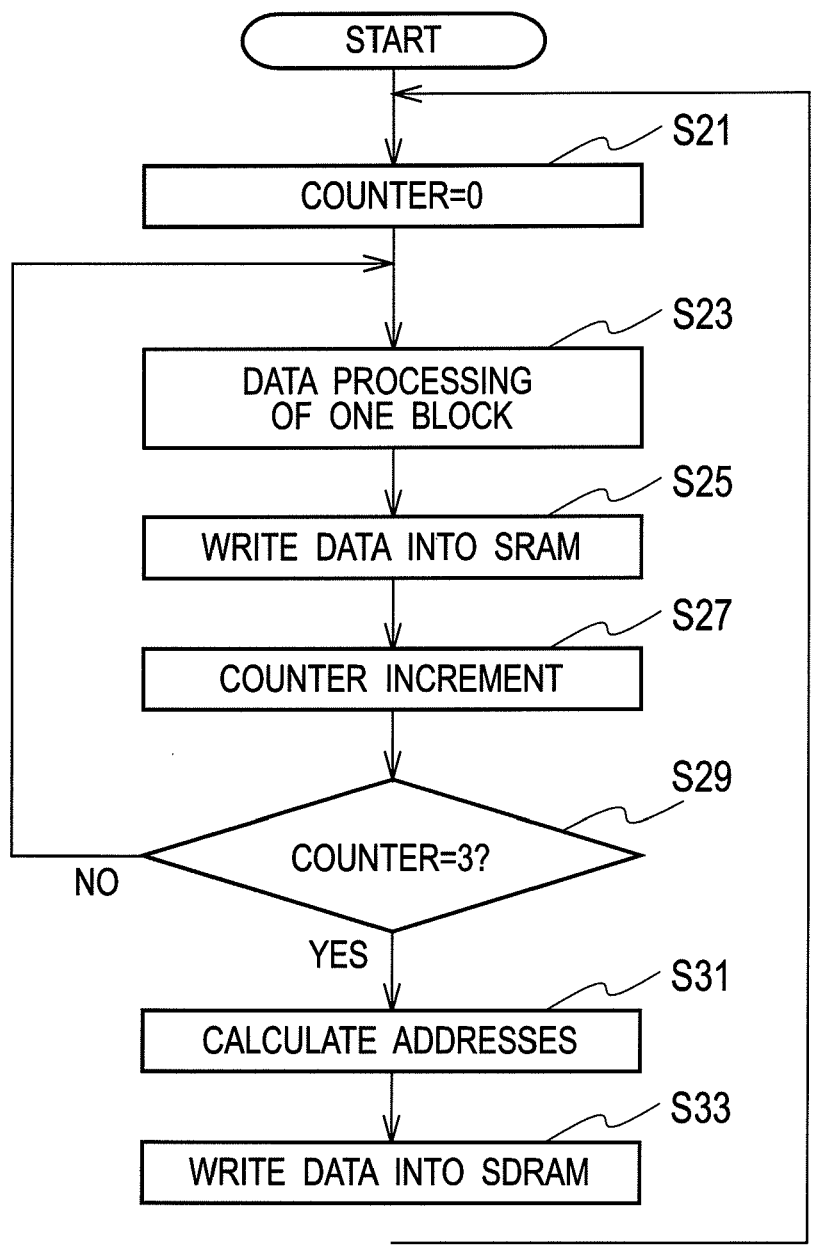
FIG. 6 It is a flowchart when data is written into SDRAM according to the exemplary embodiment of the present invention.

FIG. 6 is a flowchart when data is written into SDRAM. It is also here assumed that "the number of blocks necessary for aligning the right end of blocks with the right end of cells" in the explanation described with reference to FIG. 1 is three.

The counter 5 is initialized to have the value "0" (S21). Next, the image processor 1 processes data of one block to be processed (S23).

Next, the image processor 1 writes the data into SRAM 2 (S25). At this time, the SRAM address timing generator 6 generates an access control signal for writing.

Next, the value "1" is added to the counter 5 (S27). Next, it is determined whether or not the counter 5 has the value "3" (S29). If it is determined as NO, the processing returns to step S23.

If it is determined as YES, the SRAM address timing generator 6 calculates addresses (Bank address, Row address and Column address) of three blocks processed with reference to the SRAM address generating table 7 (S31).

Next, the data of three blocks processed is written to the calculated positions in SDRAM 3 from SRAM 2 via the data selector unit DS, the shift register unit 4 and the data selector DS1 (S33), and then the processing returns to step S21.

At this time, the SDRAM signal generator 8 controls SDRAM 3 according to the access timing of SDRAM 3. At this time, the SRAM address timing generator 6 carries out the access control of SRAM 2. At this time, the data selector DS1, the shift register unit 4 and the data selector unit DS carries out the arrangement conversion and the temporal retention of data of SRAM 2. The SDRAM signal generator controls SDRAM 3 and carries out the arrangement conversion and the control of temporal retention. The SDRAM parameter setting unit 9 sets and controls the access amount and the cell shape of SDRAM 3.

It is noted that the data selector unit DS, the shift register unit 4, the data selector DS1, the SDRAM signal generator 8 and the SDRAM parameter setting unit 9 of the image processing apparatus carry out parallel processing while causing the timing of one Bank access to differ from the timing of the other Bank access in two subsequent Bank accesses of SDRAM so as to reduce an idle time of SDRAM.

Figure 7:
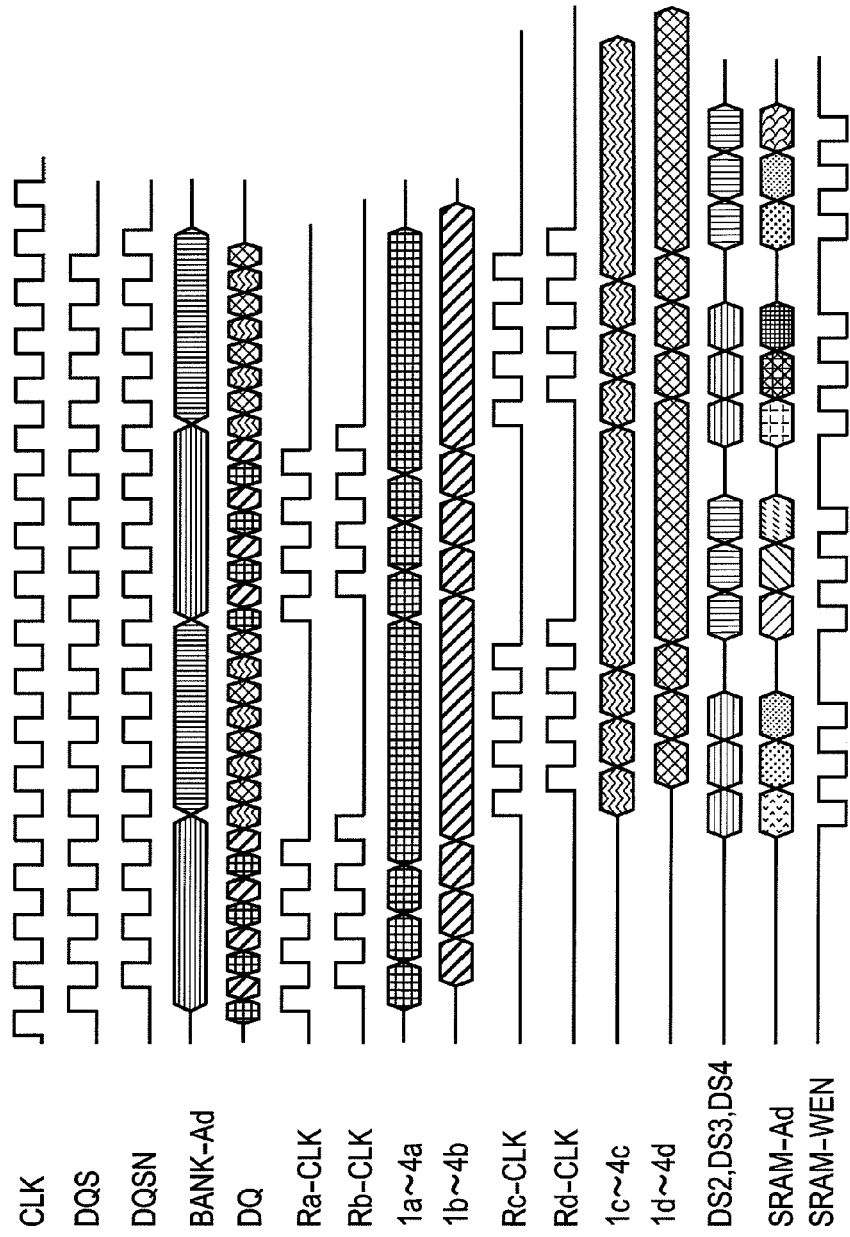
FIG. 7 It is a timing chart when data is read from Banks A and B of SDRAM according to the exemplary embodiment of the present invention.

FIG. 7 is a timing chart when data is read from Bank A and B of SDRAM.

First, the data selector DS1 selects Bank A and reads from SDRAM 3 using the bus signal DQ of 16 bits, data to be transferred to the registers 1a to 4a and 1b to 4b. Here, data transfer of 16 bits is carries out eight successive times.

The data selector DS1 also transfers to the registers 1a to 4a as a clock signal Ra-CLK in a selection time of Bank A, a signal DQS output from SDRAM 3, and sends to the registers 1a to 4a via the bus signal of 16-bits, data for the registers 1a to 4a. The registers 1a to 4a obtain the data in the timing of the clock signal Ra-CLK. Here, data transfer is carried out four successive times (four data transfers).

The data selector DS 1 further transfers to the registers 1b to 4b as a clock signal Rb-CLK in the selection time of Bank A, a signal DQSN output from SDRAM 3, and sends to the registers 1b to 4b via the bus signal of 16-bits, data for the registers 1b to 4b. The registers 1b to 4b obtain the data in the timing of the clock signal Rb-CLK. Here, data transfer is carried out four successive times (remaining four data transfers). Namely, four data transfers are carried out in the registers 1a to 4a while four data transfers which are delayed by a half clock are carried out in the registers 1b to 4b. Thus, total eight data transfers are carried out as one burst access.

Next, the data selector DS1 selects Bank B and reads from SDRAM 3 using the bus signal DQ of 16 bits, data to be transferred to the registers 1c to 4c and 1d to 4d. Here, data transfer of 16 bits is carries out eight successive times.

The data selector DS1 also transfers to the registers 1c to 4c as a clock signal Rc-CLK in a selection time of Bank B, a signal DQS output from SDRAM 3, and sends to the registers 1c to 4c via the bus signal of 16-bits, data for the registers 1c to 4c. The registers 1c to 4c obtain the data in the timing of the clock signal Rc-CLK. Here, data transfer is carried out four successive times (four data transfers).

The data selector DS1 further transfers to the registers 1d to 4d as a clock signal Rd-CLK in the selection time of Bank B, a signal DQSN output from SDRAM 3, and sends to the registers 1d to 4d via the bus signal of 16-bits, data for the registers 1d to 4d. The registers 1d to 4d obtain the data in the timing of the clock signal Rd-CLK. Here, data transfer is carried out four successive times (remaining four data transfers).

Further, in the selection time of Bank B, the data selectors DS2 and DS4 transfer data of the registers 1a to 4a and 1b to 4b to SRAM 2 via the bus signal of 40-bits. Here, data transfer of 40-bits is carried out three times.

Next, Bank A is selected, and the data selectors DS3 and DS4 transfer to SRAM 2 via the bus signal of 40-bits, data of the registers 1c to 4c and 1d to 4d while the registers 1a to 4a and 1b to 4b obtain next data.

In the figure, SRAM-Ad represents an address signal of SRAM at the time of writing data into SRAM 2. SRAM-WEN represents a writing signal to SRAM at this time.

Subsequently, the reading from Bank A via the registers 1a to 4a and 1b to 4b and the reading from Bank B via the registers 1c to 4c and 1d to 4d are alternately performed likewise.

Thus, since the reading from Bank A is performed via the registers 1a to 4a and 1b to 4b, and the reading from Bank B is performed via the registers 1c to 4c and 1d to 4d, they are alternately performed. Therefore, the reading from any one of Bank A, C, E and G and the reading from any one of Bank B, D, F and H are alternately performed likewise.

Also, while the shift register unit 4 reads data of one of Banks A and B from SDRAM, it writes data of the other of Banks A and B into SRAM, and thereby the reading from SFRAM can be performed at high speed. By a similar reason, the reading from Banks A, C, E and G and the reading from any one of Banks B, D, F and H can be performed at high speed.

Figure 8:
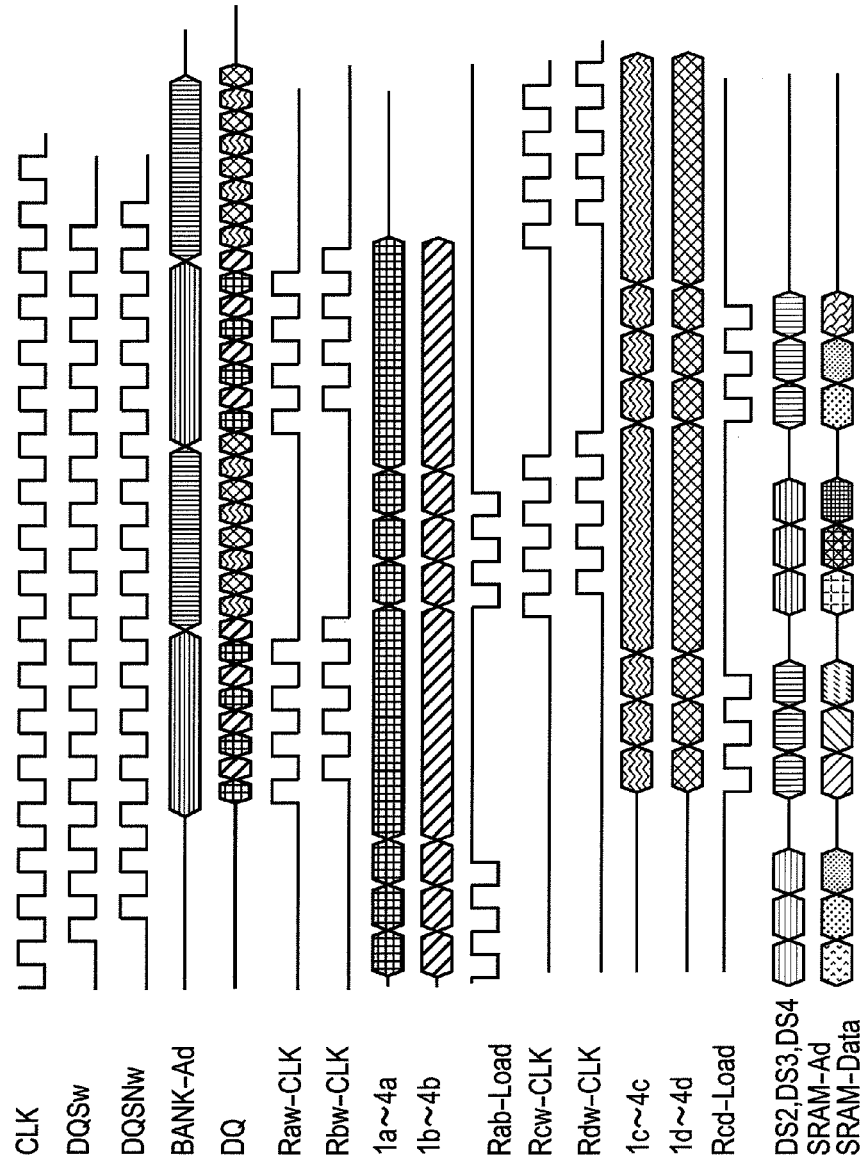
FIG. 8 It is a timing chart when data is written into Banks A and B of SDRAM according to the exemplary embodiment of the present invention.

FIG. 8 is a timing chart when data is written into Bank A and B of SDRAM

First, the data selectors DS2 and DS4 transfer to the registers 1a to 4a and 1b to 4b according to the timing of a signal Rab-Load, data to be sent from SRAM 2 via the bus signal of 40-bits. Here, data transfer of 40-bits is carried out three times.

Next, the data selectors DS3 and DS4 transfer to the registers 1c to 4c and 1d to 4d according to the timing of a signal Rcd-Load, data to be sent from SRAM 2 via the bus signal of 40-bits. Here, data transfer of 40-bits is carried out three times.

In figure, SRAM-Ad represents an address signal of SRAM at the time of reading data from SRAM 2. SRAM-Data represents a data signal at this time.

Also, while the registers 1c to 4c and 1d to 4d obtain the data in such a manner, the data selector DS1 selects Bank A, transfers to SDRAM 3 as a device-to-SDRAM signal DQSw while the signal DQS is an SDRAM-to-device signal, a clock signal Raw-CLK (which is a device-to-SDRAM signal while the clock signal Ra-CLK is an SDRAM-to-device signal) output from the resisters 1a to 4a, and transfers data of the registers 1a to 4a to SDRAM 3 using the bus signal DQ of 16-bits. Here data transfer of 16-bits is carried out four times.

Further, in the selection time of Bank A (that is, while the registers 1c to 4c and 1d to 4d obtain the data), the data selector DS1 transfers to SDRAM 3 as a device-to-SDRAM signal DQSNw while the signal DQSN is an SDRAM-to-device signal, a clock signal Rbw-CLK (which is a device-to-SDRAM signal while the clock signal Ra-CLK is an SDRAM-to-device signal) output from the resisters 1b to 4b, and transfers data of the registers 1b to 4b to SDRAM 3 using the bus signal DQ of 16-bits. Here data transfer of 16-bits is carried out four times. Namely, four data transfers are carried out in the registers 1a to 4a while four data transfers which are delayed by a half clock are carried out in the registers 1b to 4b. Thus, total eight data transfers are carried out as one burst access.

Next, while the registers 1a to 4a and 1b to 4b obtain next data, the data selector DS1 selects Bank B and transfers data of the registers 1c to 4c and 1d to 4d to SDRAM 3 via the bus signals of 16-bits. Here, data transfer of 16-bits is carried out eight times.

Subsequently, the writing via the registers 1a to 4a and 1b to 4b and the writing via the registers 1c to 4c and 1d to 4d are alternately performed likewise.

Thus, since the writing into Bank A is performed via the registers 1a to 4a and 1b to 4b, and the writing into Bank B is performed via the registers 1c to 4c and 1d to 4d, they are alternately performed. Therefore, the writing into any one of Bank A, C, E and G and the writing into any one of Bank B, D, F and H are alternately performed likewise.

Also, while the shift register unit 4 reads data of one of Banks A and B from SDRAM, it writes data of the other of Banks A and B into SRAM, and thereby the reading from SDRAM can be performed at high speed. By a similar reason, the reading from Banks A, C, E and G and the reading from any one of Banks B, D, F and H can be performed at high speed.

Figure 9:
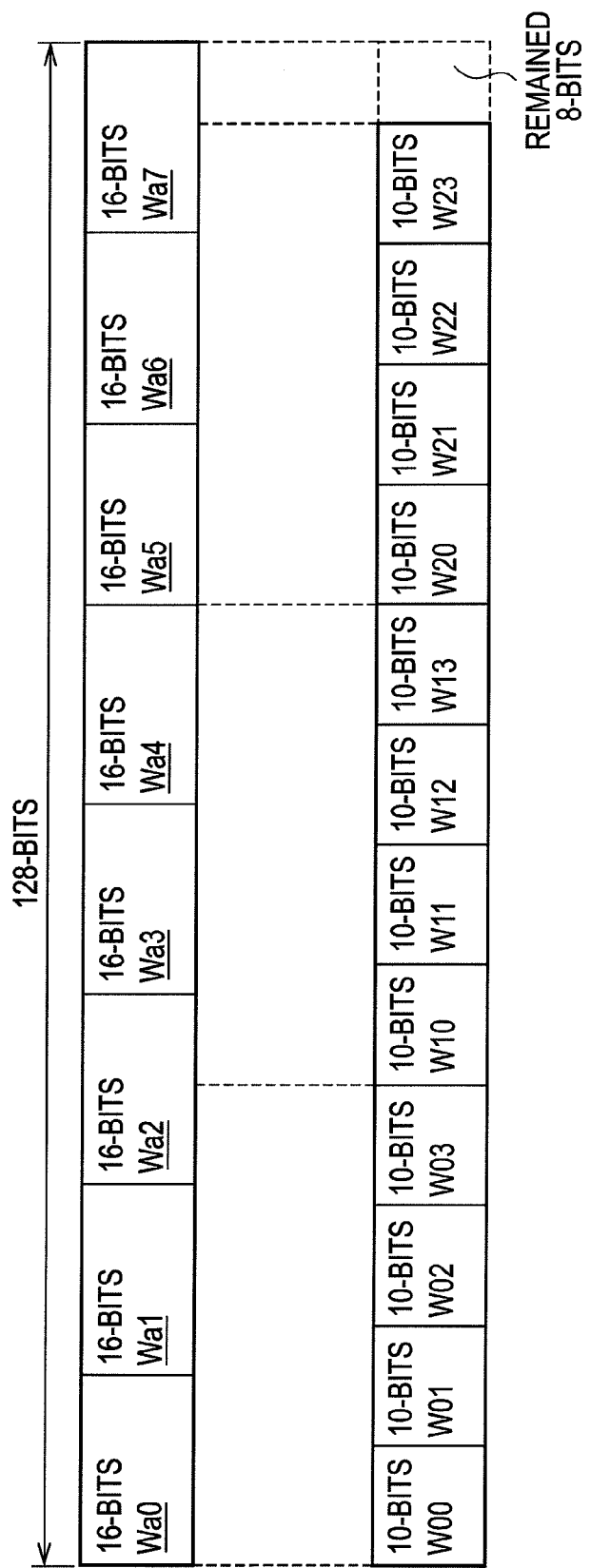
FIG. 9 It is a diagram that illustrates a relation between data of 16-bits and data of 40-bits to be read from or written into SDRAM according to the exemplary embodiment of the present invention.

FIG. 9 is a diagram that illustrates a relation between data of 16-bits and data of 40-bits to be read from or written into SDRAM 3. In reading from SDRAM 3, a data conversion having the following relation is carried out.

First, the data selector DS1 reads 16-bits word from SDRAM 3 eight times, and causes the shift register 4AB to hold them, for example. Namely, the data selector DS1 reads 128-bits composed of words Wa0 to Wa7, and causes the shift register 4AB to hold them, for example.

Next, the data selector unit DS writes into SRAM 2, data having four 10-bits words held in the shift register 4AB three times, for example. Namely, the data selector unit DS converts the words Wa0 to Wa7 into 120-bits composed of words W00 to W03, W10 to W13, W20 to W23 and W30 to W33, and writes them into SRAM 2. Remained 8-bits are removed in the shift register 4AB and the data selector unit DS, for example.

Next, the image processor 1 reads the words W00 to W03, W10 to W13 and W20 to W23 from SRAM 2.

On the other hand, in writing into SDRAM 3, a data conversion having the following relation is carried out.

First, the image processor 1 writes into SRAM 2, 120-bits composed of words W00 to W03, W10 to W13 and W20 to W23.

Next, the data selector unit DS reads from SRAM 2, the words W00 to W03, W10 to W13 and W20 to W23, and causes the shift register 4AB to hold them, for example. Remained 8-bits are added to the words W00 to W03, W10 to W13 and W20 to W23.

Next, the data selector DS1 converts into words Wa1 to Wa8 the 128-bits to which the 8-bits are added, and writes them into SDRAM 3.

(Summary of Burst Access of SDRAM)

Figure 10:
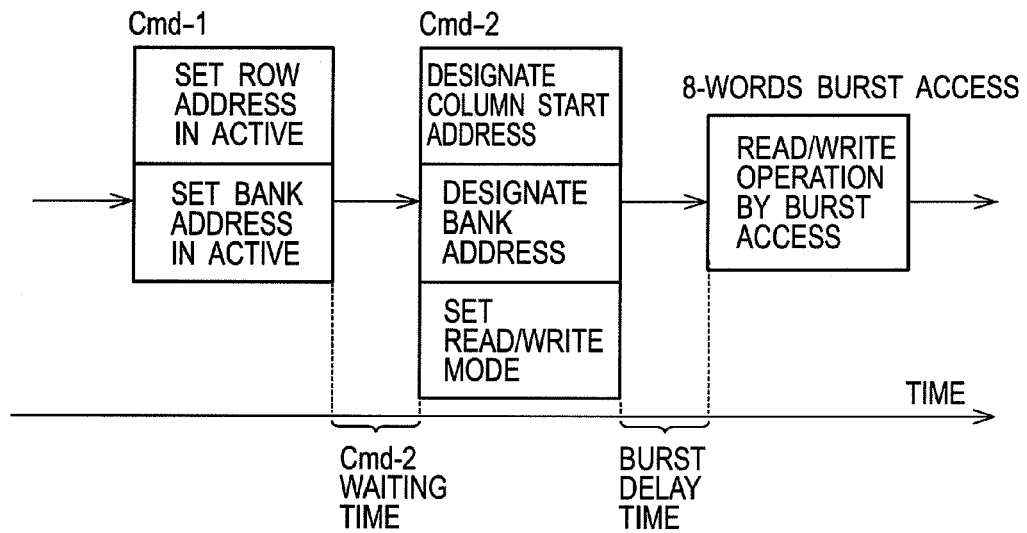
FIG. 10 It is a diagram that illustrates a setting of address and an order of a burst transfer of data according to the exemplary embodiment of the present invention.

A summary of burst access of SDRAM will be described with reference to FIG. 10. It is noted that although each command has a large duration in FIG. 10, it is one clock width in practice.

An inside structure of SDRAM is partitioned into plural Banks (four to eight Banks in DDR3-SDRAM). For example, when SDRAM of 2-Gbits is partitioned into eight Banks, one Bank has a size of 256-Mbits. When a word width of this SDRAM has 16-bits, since the number of words is 16M-words (=256-Mbits/16-bits), the number of bits of address assigned to each of 16M-words is 24-bits. The address of 24-bits includes Row address and Column address. Therefore, in a case of accessing SDRAM, an address group including Bank address, Row address and Column address is required.

In a first command Cmd-1, an address of Bank of an access target and a desired Row address in Bank of the access target are set in Active. In a second command Cmd-2, the address of Bank of the access target, a start address of Column on the desired Row address in Bank of the access target, and Read/Write mode (including a bust access setting) are designated after a predetermined time (Cmd-2 waiting time) has elapsed from the time when the first command Cmd-1 is issued. After a predetermined time (burst delay time) has elapsed from the time when the second command Cmd-2 is issued, Read or Write operation is carried out by a burst access (8-words continuous transfer) from the designated start address of Column as a stating point.

(Method of Effectively Carrying Out Burst Access of SDRAM)

Figure 11:
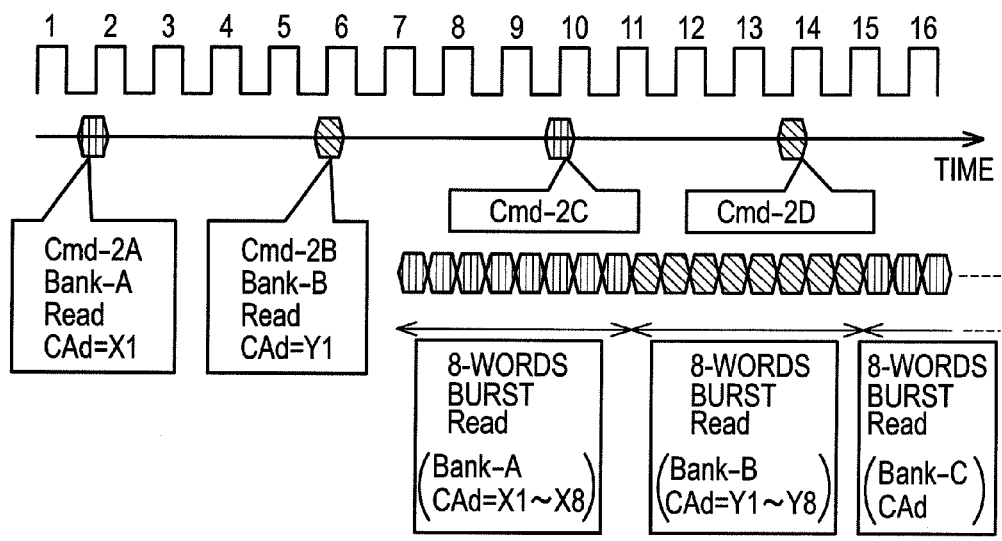
FIG. 11 It is a diagram that illustrates a flow of Read operation in an efficient continuous burst access using clock cycles in detail according to the exemplary embodiment of the present invention.

A method of effectively carrying out a burst access of SDRAM will be described with reference to FIG. 11.

For example, when data of 32 words is arranged in SDRAM, the data of 32 words is divided into four segments each having 8-words and the four segments are respectively arranged in four Bank A, B, C and D because it is impossible to carry out a continuous burst access to different Row addresses of the same Bank in SDRAM. When the data of 32 words arranged this way is read, first commands Cmd-1A, Cmd-1B, Cmd-1C and Cmd-1D are initially issued and then addresses of Banks A, B, C and D of access targets and desired Row addresses in Bank A, B, C and D of the access targets are set in Active (not shown in FIG. 11). Next, second commands Cmd-2A, Cmd-2B, Cmd-2C and Cmd-2D are issued and then the addresses of Banks A, B, C and D of the access targets, start addresses (X1, Y1 and the like) of Columns on the desired Row addresses in Banks A, B, C and D of the access targets, and Read modes are designated. Here, in a case where duration of each command, duration of burst delay time and duration of 8-words burst access are respectively one clock, six clocks and four clocks, if the second command is issued in every four clocks, the burst access is effectively and continuously carried out (see FIG. 11).

The Cmd-2 waiting time and the burst delay time are previously determined as specification of SDRAM. In the above-described example, if the Cmd-2 waiting time coincides with a period until three first commands have been issued, the second command Cmd-2A is issued after the first commands Cmd-1A, Cmd-1B and Cmd-1C have been issued, so as to effectively and continuously carry out the burst access. Then, after the first command Cmd-1D has been issued, the second commands Cmd-2B, Cmd-2C and Cmd-2D are issued.

Generally, a delay from the issue of first command until the start of its burst access requires about 12 clocks. In continuous burst access, if Bank address and Row address of an access target are not changed, the first commands firstly issued can be commonly used. Thus, a delay from the issue of second command until the start of its burst access requires about eight clocks. In SDRAM, the first command can be issued in every eight clock circles or less. Thus, if 8-words burst accesses are continuously carried out with respect to Banks differing from each other, the most effective access with no gap is realized. Therefore, in order to realize an access efficiency of SDRAM, (1) 8 words burst access is carried out with respect to a data segment allocated in each Bank, (2) adjacent data segments are allocated in Banks differing from each other, and (3) when a continuous burst access is carried out with respect to a large amount of data, the first commands are adequately issued to change the Bank and/or Raw address of an access target.

Thus, when the continuous burst access to Banks is carried out based to optimal command scheduling, the maximum access amount per unit time is realized. Also, by carrying out similar processing at the time of Write operation, the maximum access amount per unit time is realized.

FIG. 12 is a diagram that illustrates a formation example of image data in one frame in the case where the amount of burst access is 128-bits when one word of SDRAM has 16-bits and image data has 10-bits/pixel.

Here, a cell has 3-pixels in a horizontal direction and 4-pixels in a vertical direction. It is desirable to include descriptions of Bank address, Row address and Column address in the cell.

When 128-bits are represented by 10-bits/pixel, it divided into 12-pixels (cell). There are some options for the geometric arrangement of 12-pixels, more specifically, there are a total of six arrangement methods 1×12, 2×6, 3×4, 4×3, 6×2 and 12×1 (first number represents the number of pixels in the horizontal direction and second number represents the number of pixels in the vertical direction). In the drawing, RA represents Row address and CA represents Column address.

In FIG. 12, in each of the first row, the third row . . . , cells are repeatedly arranged in order of Banks A, B, C and D and Column addresses are changed. If Column address reaches the maximum value, Row addresses are changed and cells are repeatedly arranged in order of Banks A, B, C and D. In each of the second row, the four row . . . , cells are repeatedly arranged in order of Banks E, F, G and H and Column addresses are changed. If Column address reaches the maximum value, Row addresses are changed and cells are repeatedly arranged in order of Banks E, F, G and H and Column addresses are changed. If Column address reaches the maximum value, Row addresses are changed and cells are repeatedly arranged in order of Banks E, F, G and H.

In FIG. 12, an access along a line arrow in a hatching rectangular region of 5×2 will be described. At the time of shifting from a cell in an upper row to a cell in a lower row, if both of the cells belong to the same Bank, a continuous access can not be carried out. In order to avoid a continuous access to the same Bank after shifting in the vertical direction and allow a continuous access to a different Bank after shifting in the vertical direction, it is preferred to arrange eight Banks. Thus, even if Raw address is changed, a continuous burst access can be carried out because the arrangement of Banks in an upper row differs from that in a lower row.

Namely, a reason why eight Banks are alternately arranged is as follows. If an alternate burst access to two or more Banks is not carried out, the maximum access speed can not be obtained. That is, since a gap occurs between bursts in a continuous access to the same Bank, the maximum access speed is not continuously realized.

In an access in the same Column of a certain Bank, it is necessary to change Row address because it has about 1024 words (16-Kbits). At this time, since the change of Row address needs a redundant time, it is necessary to use three or more Banks alternately. By reason of easy control, it is reasonable to use four Banks alternately in a circuit configuration.

At the time of accessing cells again after accessing cells in the horizontal direction and then shifting by one cell in the vertical direction, if different Banks are not arranged, the maximum access speed is not realized. Thus, four Banks are arranged in the horizontal direction in sequence and two Banks are alternately arranged in the vertical direction. In such arrangement, for any rectangular region (plural block regions), a burst access of SDRAM with the maximum access speed can be realized.

Figure 13:
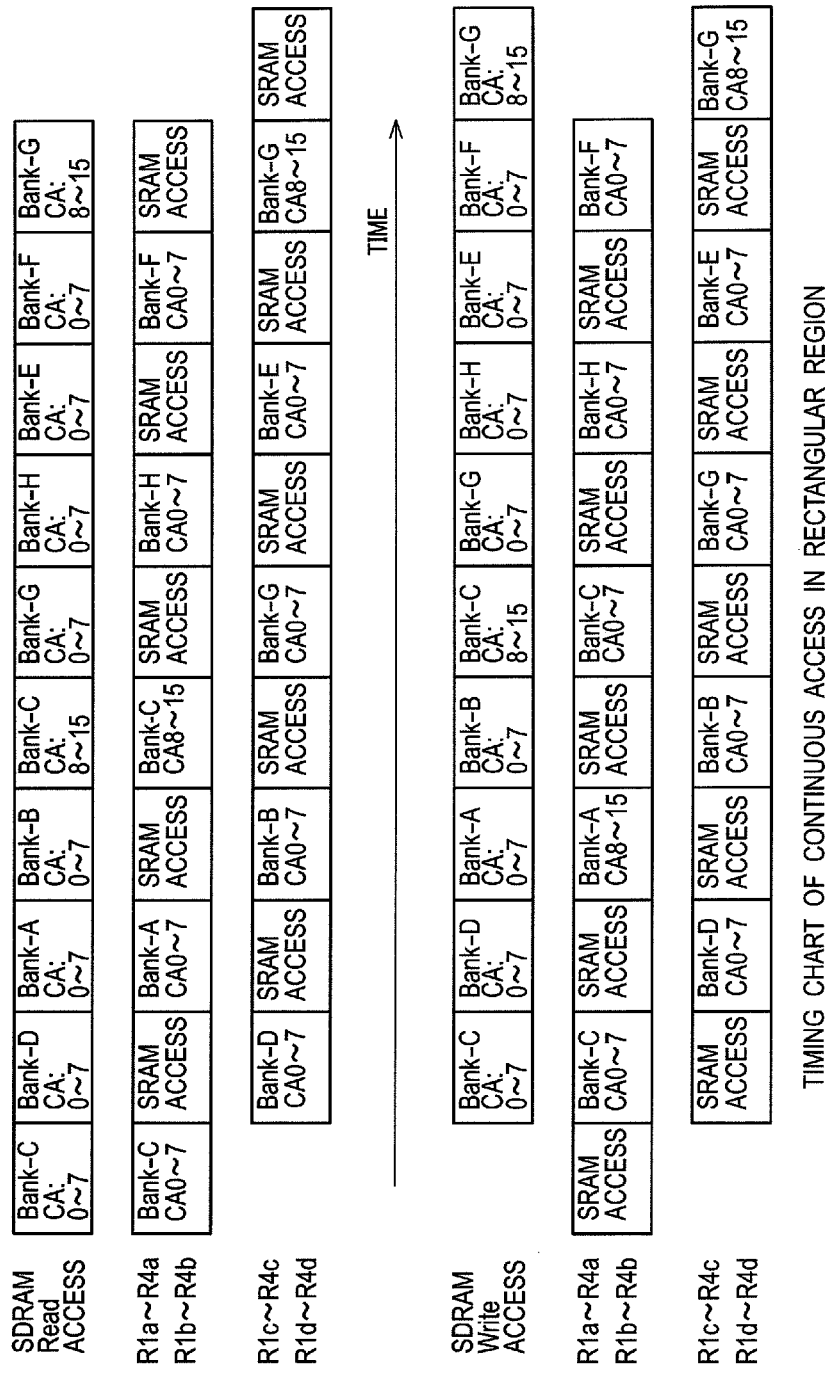
FIG. 13 It is a timing chart when the image data structure of FIG. 12 is employed.

FIG. 13 is a timing chart when the image data structure of FIG. 12 is employed. FIG. 13 illustrates operations of eight Banks and two pairs of register groups in Read operation or Write operation along the line arrow in the rectangular region of 5×2 cells in FIG. 12.

In FIG. 13, at a part illustrated as "SRAM access", the data transfer operation between SDRAM access buffer registers (sorting registers) and input-and-output of the image processing device are carried out. At the time of Read operation of SDRAM, Read operation corresponds to SRAM access after SDRAM access, and the read Bank data is transferred to SRAM of the image processing device. At the time of Write operation of SDRAM, it corresponds to SDRAM access after SRAM access, and data from the image processing device to be written subsequently is transferred from SRAM of the image processing device to the SDRAM access buffer register.

As shown in FIG. 13, by alternately arranging eight cells, a continuous burst access in order of Banks C, D, A, B, C, G, H, E, F and G in the rectangular region of 5×2 can be realized.

It is noted that although one cell is formed by 3-pixels×4-lines in FIG. 12, one burst access only need to have 12-pixels (e.g., 6-pixels×2-lines).

Further, in consideration of a color image, a method of using all 12-pixels as luminance pixels or chrominance pixels is possible for 4:2:2 chroma format. In this case, different Banks may be used for a luminance signal and a chrominance signal, and different Row addresses may be set for a luminance and a chrominance. Also, 12-pixels may be divided into 6-pixels for a luminance and 6-pixels for a chrominance.

In the present embodiment, one pixel is processed with 10-bits. If one pixel is processed with 12-bits, for correspondence between a data width of 12-bits and a SDRAM high speed burst access unit of 128-bits, it is assumed that ten data widths of 12-bits are included in 128-bits.

In this case, the formula "128-bits=12-bits×10+8-bits" is satisfied and remained 8-bits are deleted with no use of it. In this case, an arrangement in an image memory has 1×10, 2×5, 5×2 or 10×1, and an optimal arrangement is selected from them.

When SDRAMs with two chips configuration are used in parallel, a burst access unit has 256-bits. At this time, there are a manner in which 256-bits is represented by 12-bits×21+4-bits and a manner in which 256-bits is represented by 12-bits× 20+16-bits. If 21-pixels is used, an arrangement in an image memory has 1×21, 3×7, 7×3 or 21×1. If 20-pixels is used, an arrangement in an image memory has 1×20, 2×10, 4×5, 5×4, 10×2 or 20×1.

As described above, even if a bit width used for accessing a memory differs from a bit width used for accessing an image processing device, the present embodiment can be applied.

Figure 14:
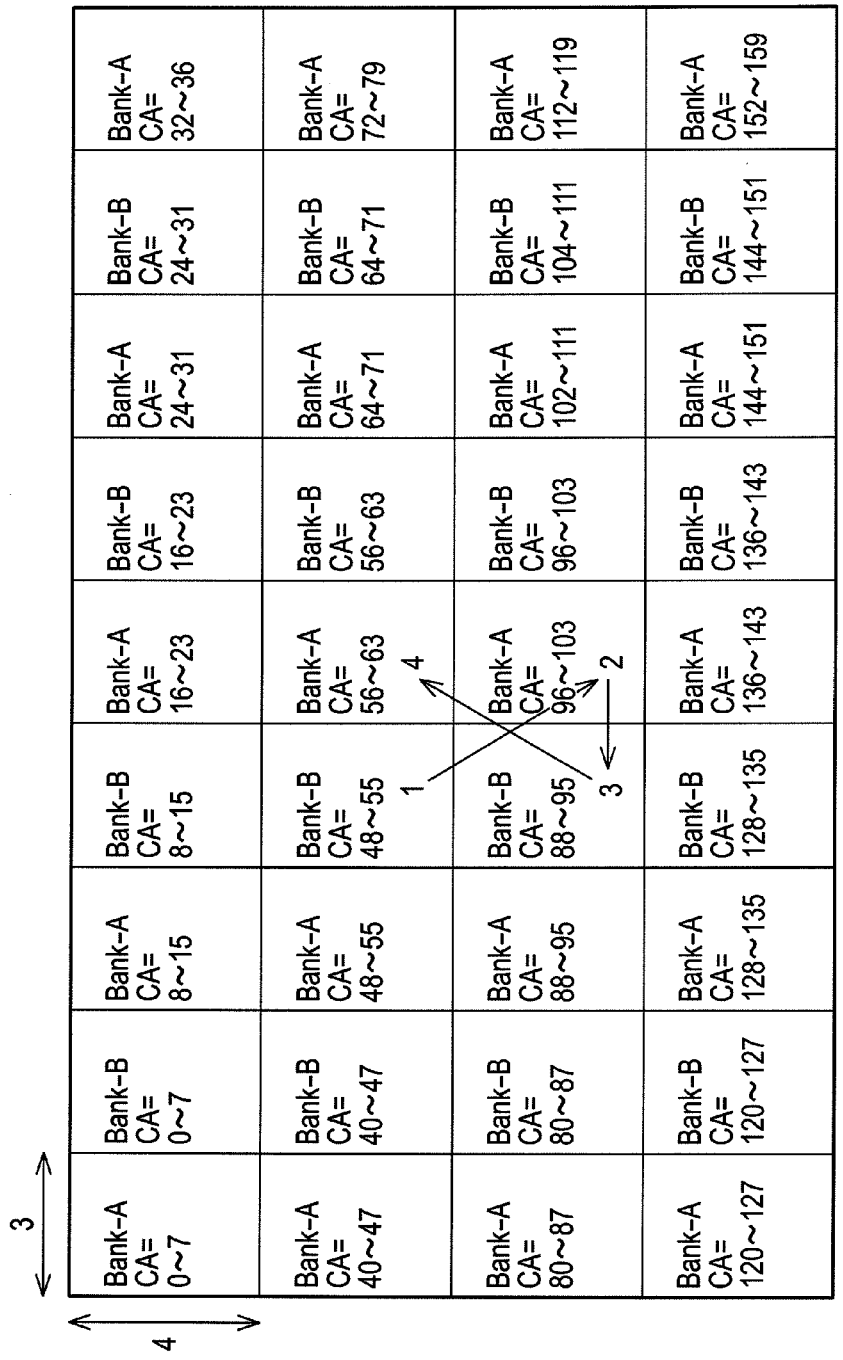
FIG. 14 It is a diagram that illustrates that an efficient continuous burst access is realized even if a zigzag access is carried out, according to the exemplary embodiment of the present invention.

FIG. 14 illustrates that a continuous burst access with efficiency is also realized by a zigzag access in place of an access to an adjacent region in a horizontal direction or a continuous access to an upper limit adjacent region in a vertical direction.

As described above, although the exemplary embodiment of the present invention has been described, as a more concrete application field according to the above-described image processing device, it is possible to configure an encoder or a decoder compliant with "High 4:2:2 Profile" standard, "High 10 Profile" standard or the like, which is specifically directed to a high quality video, in ITU-T Recommendation H.264 which is Motion Picture Coding International Standard, at a low price.

Use of SDRAM is essential for implementation of an encoder or a decoder for motion picture. Recently, SDRAM is developed in order of DDR, DDR2 and DDR3. A storage capacity of current mainstream DDR3 SDRAM has about 1-Gbits to 2 Gbits. This capacity can store hi-vision images by 30 to 60 frames. Since the encoder or decoder of H.264 is normally realized with a storage capacity having about 4 to 6 frames, recent SDRAM has enough capacity as a storage requirement.

On the other hand, it is not always sufficient for SDRAM access. Due to this, in order to secure an access amount, two to four SDRAMs are used while one SDRAM is sufficient for storage capacity.

Although a more high quality image can be obtained by expanding each piece of image data from 8-bits to 10-bits, an invention to increase access efficiency is required in view of SDRAM. In addition, an operation speed of SDRAM has a clock frequency of 500 MHz or more and image signal processing is carried out in parallel. The present invention realizes an encoder and a decoder suitable for such situation, and produces an effect for various image signal processing applications (a medical image, a frame frequency conversion, an image recognizing device and the like).

In order to store a high quality image for long periods, HDD (Hard Disk Drive) is also an important storage. HDD has a configuration of a conventional power-of-two value unit, and an access speed for storage capacity of HDD recently increases. For a high quality AV (Audiovisual) application such as 10-bits video or 20-bits video, the effect of the present invention is applied. Since DVD (Digital Versatile Disk), BD (Blue-ray Disk) and the like also have data configurations of a power-of-two value as well as HDD, the effect of the present invention is applied to realization of a high quality signal processing device.

A sector size (about 2048-bites) of a digital storage medium such as HDD, DVD or BD is larger than the burst size of SDRAM described above. Thus, as well as SDRAM, a data configuration of 8-bits unit (bite) may be converted into a data configuration of 10-bits unit or 12-bits unit, for every 128-bits (16-bites) or 256-bits (32-bites).

REFERENCE SIGNS LIST 1 image processor
2 SRAM
3 SDRAM
4 shift register unit
5 counter
6 SRAM address timing generator
7 SRAM address generating table
8 SDRAM signal generator
9 SDRAM parameter setting unit
DS data selector unit
DS1 to DS4 data selectors
4AB, 4CD shift registers
1a to 4a, 1b to 4b, 1c to 4c, 1d to 4d registers

The invention claimed is:

1. An image processing device comprising:
a memory that stores therein data related to an image before or after processing; and
an image processor that processes the data related to the image,
wherein a region corresponding to a unit in the image processed by the image processor is defined as a block;
wherein a region smaller than the block corresponding to a unit of data in the image transferred between the memory and the image processor is defined as a cell, and
in a case where when one block and a plurality of cells are arranged along a scanning direction of the image, both ends of them in the scanning direction are not aligned, the image processor carries out processing while defining at least two blocks as a processing unit such that the at least two blocks and a second plurality of cells are arranged so that both ends of them in the scanning direction are aligned, wherein the second plurality of cells is greater than the plurality of cells.

2. The image processing device of claim 1, wherein the processing unit does not exceed 10 blocks.

3. The image processing device of claim 1, wherein the block includes a luminance component and chrominance components.

* * * * *